(12) United States Patent
Freeborn

(10) Patent No.: US 8,100,615 B1
(45) Date of Patent: Jan. 24, 2012

(54) LOAD SECURING AND MOVING APPARATUS FOR A TRUCK BED

(76) Inventor: Perry Freeborn, Nine Mile Falls, WA (US)

( * ) Notice: Subject to any disclaimer, the term of this patent is extended or adjusted under 35 U.S.C. 154(b) by 167 days.

(21) Appl. No.: 12/589,034

(22) Filed: Oct. 16, 2009

(51) Int. Cl.
*B60P 7/08* (2006.01)

(52) U.S. Cl. .......... 410/130; 410/133; 410/140

(58) Field of Classification Search .......... 410/129, 410/130, 132, 133, 140, 150; 224/42.33, 224/42.34; 296/37.6; 220/533, 534, 544, 220/545
See application file for complete search history.

(56) References Cited

U.S. PATENT DOCUMENTS

| | | | |
|---|---|---|---|
| 4,121,849 A | 10/1978 | Christopher | |
| 5,975,819 A * | 11/1999 | Cola | 410/129 |
| 6,250,700 B1 | 6/2001 | Traxler | |
| 6,315,346 B1 * | 11/2001 | Martin | |
| 6,971,828 B2 | 12/2005 | Bernardo | |
| 7,214,018 B2 | 5/2007 | Lussier | |
| 7,273,336 B2 | 9/2007 | Silamianos et al. | |
| 2007/0098516 A1 | 5/2007 | Loftis et al. | |
| 2008/0101885 A1 | 5/2008 | Kmita | |

\* cited by examiner

*Primary Examiner* — Stephen Gordon
(74) *Attorney, Agent, or Firm* — William A. Jeckle

(57) ABSTRACT

A load securing and moving device for a truck bed provides a slide rail affixed to each opposing inner side of the truck bed proximate an upper edge of each inner side. A sliding gate block carried on each slide rail communicates with an endless loop moving device carried inside a channel defined by each slide rail to move the sliding gate block along the length of each slide rail. A drive shaft communicates between the first slide rail and the second slide rail to transfer motion therebetween. A hand crank communicating with the endless loop moving device within the channel provides for forward and rearward movement of sliding gate blocks along the slide rails. A gate removably engages with and extends between the two sliding gate blocks providing a load securing and moving apparatus within the truck bed.

14 Claims, 6 Drawing Sheets

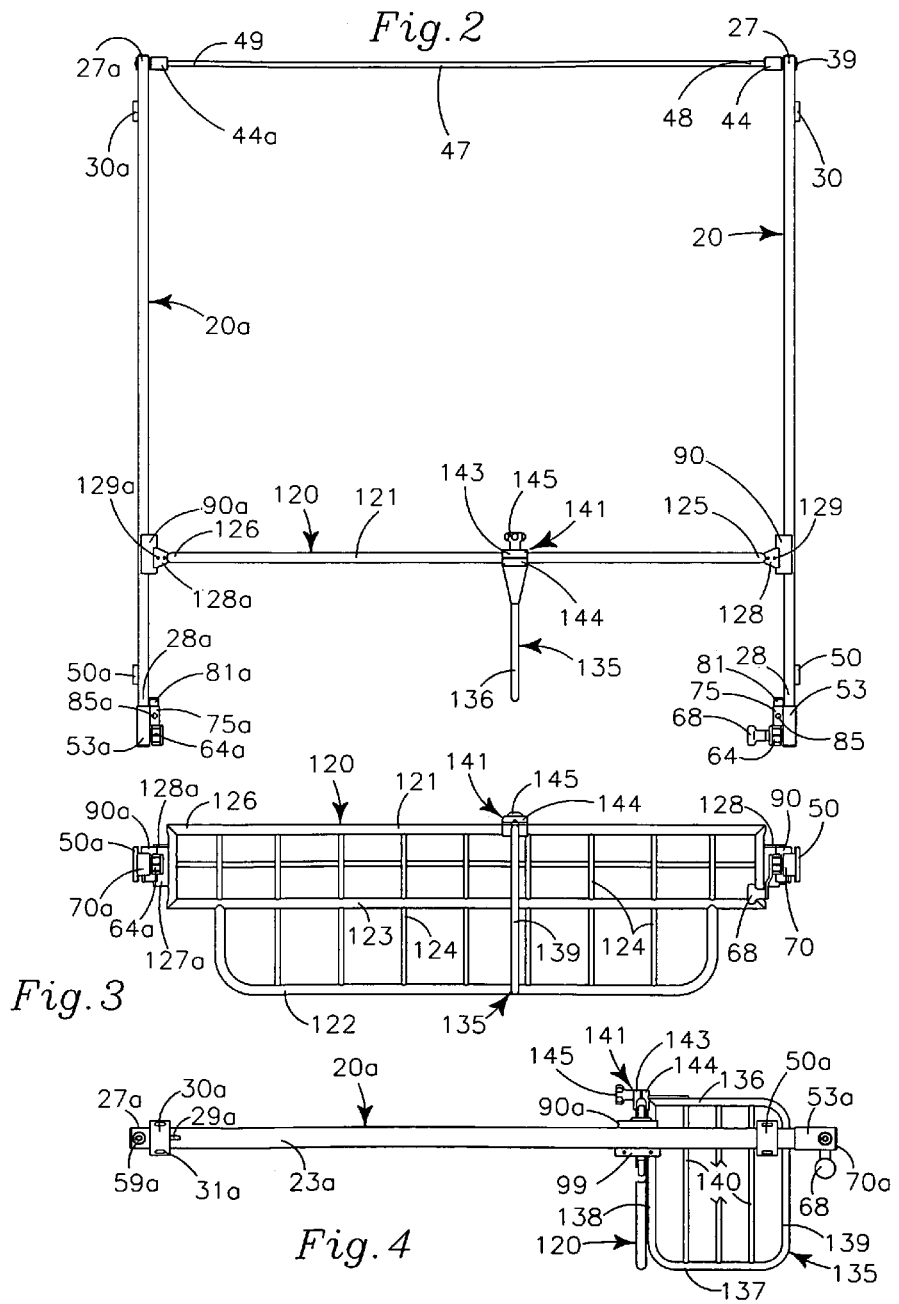

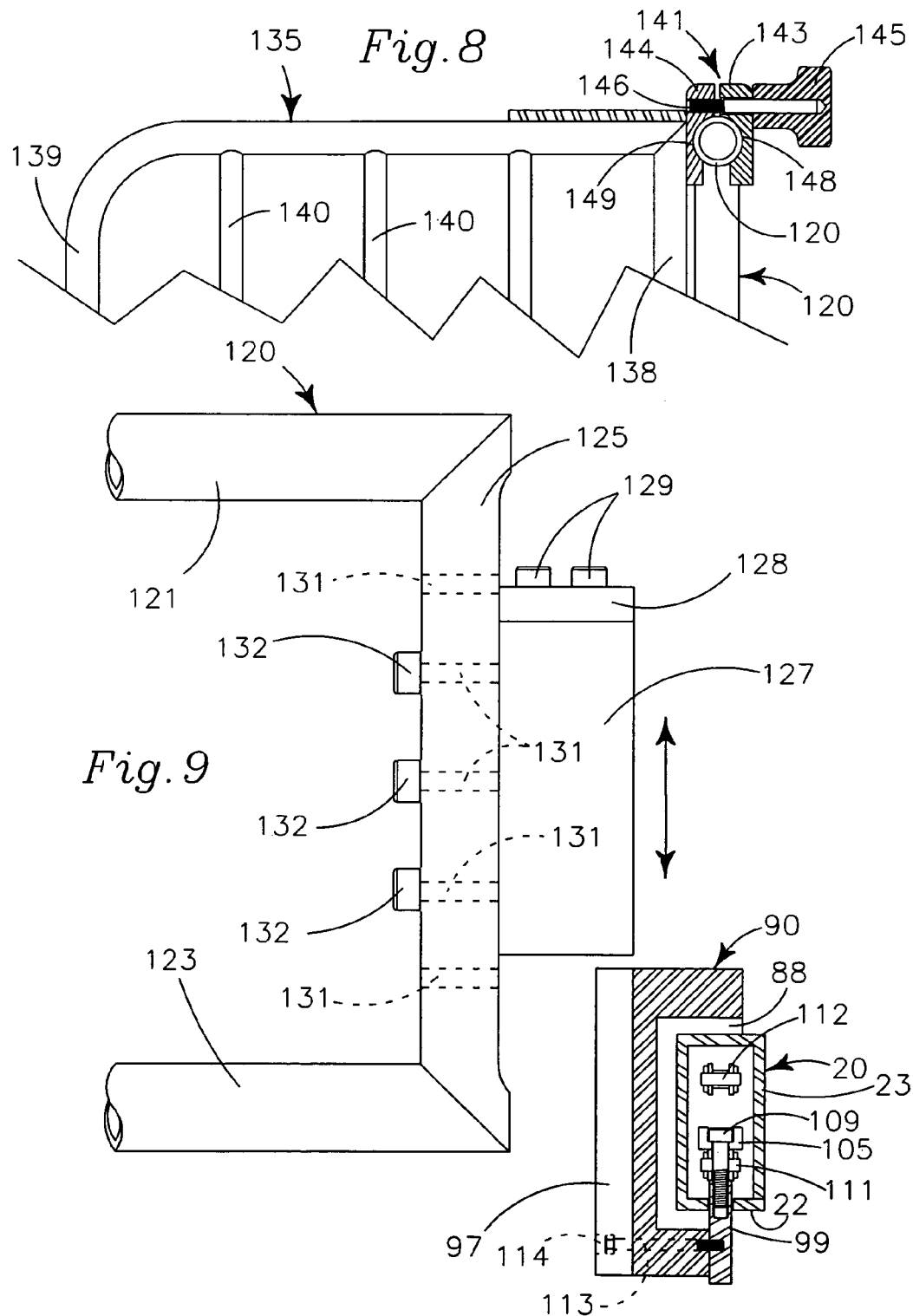

LOAD SECURING AND MOVING APPARATUS FOR A TRUCK BED

RELATED APPLICATIONS

There are no prior patent applications related hereto filed in the United States of America or any other country.

BACKGROUND OF INVENTION

1. Field of Invention

This invention relates to motor vehicles, and more particularly to a bed divider apparatus for positionally restraining and moving a load within a truck bed.

2. Background and Description of Prior Art

Motor vehicles such as pickup trucks and some trailers have a bed for carrying loads of various sizes and shapes.

Typically, a truck bed is little more than a rectilinear open top volume with a few tie-down points spacedly arrayed along the perimeter of interior walls or along a bed rail. In some instances truck beds may be converted into trailers. The term "truck bed" is used generically herein to include cargo areas of powered vehicles as well as trailers Unsecured loads and various cargo items including partial loads may move about a truck bed due to forces generated by turning, accelerating, stopping and driving over bumpy terrain. For that reason it is desirable to restrain such loads from movement within the truck bed so that the loads do not move or slide around within the truck bed during use of the vehicle.

Truck bed dividers are used to secure and organize loads within a truck bed and to restrain undesirable movement of such loads in forward and rearward directions. Such dividers generally comprise an elongate element attached to each inner side of the truck bed. A transversely extending divider gate communicates between the elongate elements. Manual fastening means at each end portion of the divider gate, such as hand tightened squeeze clamps allow the divider gate to be positionally secured.

Known truck bed dividers, while useful, continue to have drawbacks because they require that a user have ready access to both end portions of the divider gate to secure the gate in position. Frequently, this requires a user to climb into the truck bed to loosen and thereafter tighten the fastening means. Although this may not be difficult for persons of average health and mobility, it can be difficult, and perhaps impossible, for a person having limited mobility, or when the truck bed is enclosed with a canopy or tonneau cover. Further, known divider gates typically require the gate be secured in position prior to the truck bed being loaded with gear, equipment, cargo and the like. Moving or adjusting the position of the divider gate after the truck bed has been loaded therefore requires the user to either unload the gear, equipment and cargo or crawl over the load to make the adjustment. As noted previously, this can be difficult if not impossible for many persons who use and operate pickup trucks.

What is needed is a truck bed divider that is infinitely adjustable within the truck bed to prevent undesirable movement of loads, cargo and articles of varying shapes and sizes. Even more particularly, what is needed is a truck bed divider that can be used to assist in loading and unloading a truck bed and can be quickly and easily moved out of the way to allow large items, such as an all-terrain vehicle, or a motorcycle, to be loaded and carried within the truck bed without interference from the truck bed divider. Further what is needed is a truck bed divider that can be used with a truck bed that is enclosed by a canopy or tonneau cover and does not require a user to climb into the truck bed, or have access to both ends of the gate over the truck bed sides. Further what is needed is a truck bed divider that allows positional adjustment of the divider after the load has been placed in the truck bed.

My invention overcomes various of the aforementioned drawbacks to known truck bed dividers by providing an infinitely adjustable load securing and moving apparatus for a truck bed.

My load securing and moving apparatus for a truck bed provides a gate that is infinitely adjustably movable longitudinally within the truck bed on roller chains carried by sprockets within medial channels of slide rails mounted on opposing inner side portions of the truck bed. A drive shaft adjacent forward end portion of the truck bed communicates between a sprocket carried by a first slide rail and a sprocket carried by a second slide rail and transfers rotational motion therebetween. Sliding gate blocks communicate with the roller chain and are slidably carried on each slide rail for longitudinal movement therealong responsive to translational movement of the interconnected roller chain. The gate removably extends between the two spaced apart sliding gate blocks.

A hand crank releasably engaged with a sprocket proximate tailgate end portion of slide rail allows a user to manually rotate the sprocket and impart translational movement to the roller chain, sliding gate blocks and gate. A T-gate releasably interconnects with the transversely extending gate either forwardly or rearwardly thereof, and is movable perpendicularly relative to the gate allowing loads to be secured from side to side movement with the truck bed.

My invention may also be used to facilitate unloading a truck bed. Rotation of the hand crank causes the gate to move rearwardly within the truck bed forcing loads rearward of the gate to slide rearwardly along the truck bed bottom toward the tailgate so that the load may be removed from the truck bed without the user needing to climb into the truck bed. Similarly, my invention can be moved rearwardly and forwardly after equipment, gear, cargo and the like has been loaded in the truck bed to secure the loaded items between the transverse gate and the tailgate, or between the transverse gate and the forward truck bed wall.

My invention does not reside in any one of the identified features individually but rather in the synergistic combination of all of its structures, which give rise to the functions necessarily flowing therefrom as hereinafter specified and claimed.

SUMMARY

A load securing and moving device for a truck bed provides slide rails affixed to opposing inner sides of the truck bed. A sliding gate block carried on each slide rail communicates with means for moving the sliding gate block along the length of the slide rail. A drive shaft communicates between the moving means of first slide rail and the moving means of second slide rail to transfer motion therebetween. Rotation means communicating with the moving means provides motion for forward and rearward movement of sliding gate blocks. A gate removably extends between the sliding gate blocks providing a load securing and moving apparatus within the truck bed. A positionally adjustable T-gate releasably fastened to the transversely extending gate prevents side-to-side movement of the load within the truck bed.

In providing such an apparatus it is;

a principal object to provide an infinitely adjustable load securing and load moving apparatus for a truck bed.

a further object to provide such an apparatus that secures loads and restrains undesirable movement of the loads in forward, rearward and side-to-side directions.

a further object to provide such an apparatus that is movable and infinitely adjustable to accommodate the load being carried in the truck bed.

a further object to provide such an apparatus that allows full and partial use of the truck bed in carrying loads.

a further object to provide such an apparatus that is easily removable from the truck bed.

a further object to provide such an apparatus that allows a user to move items from a forward portion of a truck bed to a tailgate end portion of a truck bed without the user having to crawl into the truck bed.

a further object to provide such an apparatus that allows a user to move items from a tailgate end portion of a truck bed to a forward portion of a truck bed without the user having to crawl into the truck bed.

a further object to provide such an apparatus that allows a user to secure an item in a corner of the truck bed.

a further object to provide such an apparatus that may be powered.

a further object to provide such an apparatus that may be manually operated.

a further object to provide such an apparatus that may be locked in position to prevent undesirable movement of the gate.

a further object to provide such an apparatus that is easy to use and cost effective to manufacture.

a further object to provide such an apparatus that may be used in a vehicle having a canopy enclosing the truck bed.

a further object to provide such an apparatus that may be used in a vehicle having a tonneau cover covering the truck bed.

a still further object to provide such an apparatus that may be used in a vehicle having an enclosed or covered truck bed.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 2 is an orthographic plan view of my load securing and moving apparatus for a truck bed.

FIG. 3 is an orthographic rear, forward looking view of the gate extending between the sliding gate blocks carried on the slide rails.

FIG. 4 is an orthographic driver's side view of my load securing and moving apparatus for a truck bed showing the "T" gate attached to the gate and extending rearwardly therefrom.

FIG. 8 is an orthographic partial cut-away cross-section side view of the T-gate showing the T-gate mounting clamp interconnected to the top rail of the gate.

FIG. 9 is an orthographic rear, forward looking partial cut-away cross section view of the slide rail, sliding gate block, roller chain and chain plate, showing how the transverse gate, gate block vane and gate vane bumper slidably interconnect with the sliding gate block.

DESCRIPTION OF PREFERRED EMBODIMENT

Figure 10:
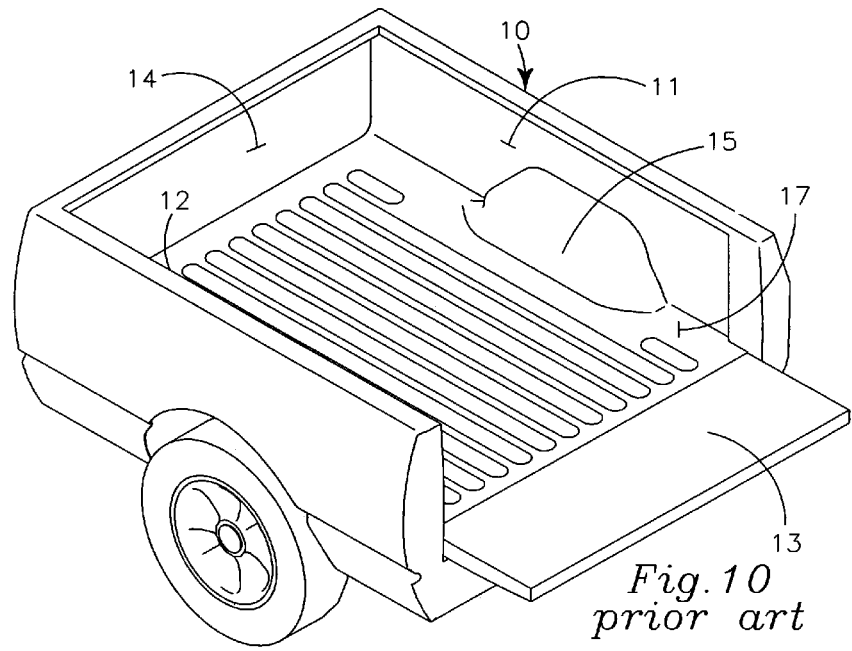
FIG. 10 is prior art showing an isometric, top, side and rear view of a truck bed.
Figure 1:
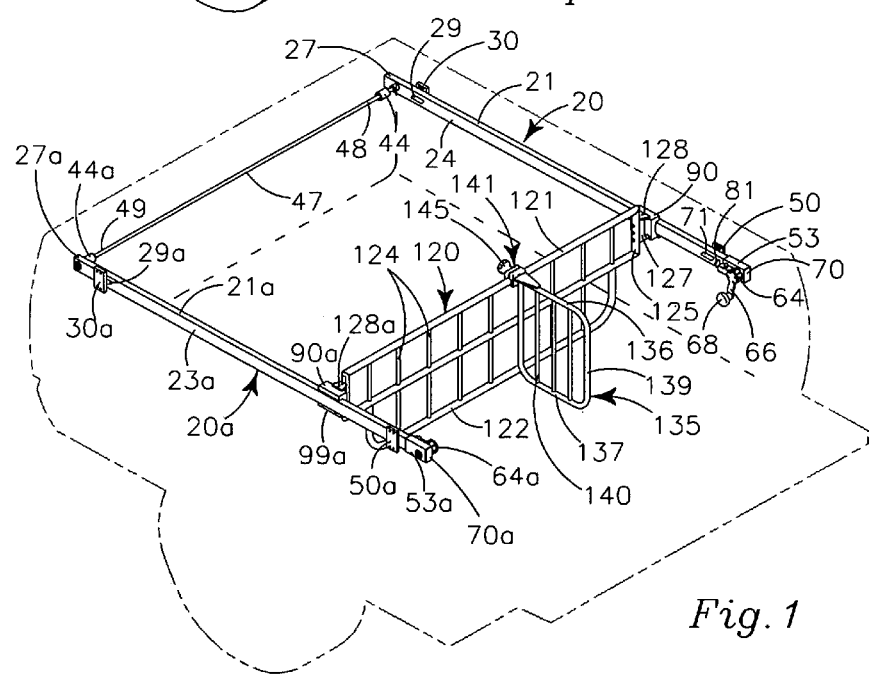
FIG. 1 is an isometric top, rear and driver's side view of my load securing and moving apparatus for a truck bed shown as my invention would be installed in a truck bed, with the truck bed shown in phantom outline.

As used herein, the term "forward", its derivatives, and grammatical equivalents refers to that portion of my apparatus that is positioned proximate an operator cab of a vehicle having a bed for carrying cargo and the like. The term "rearward", its derivatives, and grammatical equivalents refers to that portion of my apparatus that is positioned proximate a tailgate end portion of a truck bed and distal from the operator cab. The term "outer", its derivatives, and grammatical equivalents refers to a driver side portion or passenger-side portion of a truck bed as opposed to the laterally medial portion of a truck bed.

My load securing and moving apparatus for truck bed generally provides first slide rail 20 carried on first inner side 11 of truck bed 10, second slide rail 20a carried on second inner side 12 of the truck bed 10, a drive shaft 47 communicating between the first slide rail 20 and the second slide rail 20a and a gate 120 extending between the first slide rail 20 and the second slide rail 20a.

For purposes of brevity and clarity, only first slide rail 20 will be described with particularity as the first slide rail 20 and the second slide rail 20a are mirror images of one another. Lower-case letter "a" is used to identify and distinguish the elements of the second slide rail 20a from the elements of the first slide rail 20.

Slide rail 20 is elongate having a top 21, a bottom 22, an outer side 23, an inner side 24, a first front end portion 27 and a second rear end portion 28. A medial channel 26 is defined by the slide rail 20 extending between the first front end portion 27 and the second rear end portion 28. Slot 25 is defined in the bottom 22 communicating between and extending from the first front end portion 27 to the second rear end portion 28. In a first embodiment the slide rail 20 is rectilinear in cross-section and the slot 25 is defined in the bottom 22. It is contemplated however that in other embodiments the slide rail 20 may have a cross-section in a shape other than rectilinear such as circular (not shown), oval (not shown), polygonal (not shown) and the like. It is also contemplated that the slot 25 may be defined in a location other than the bottom 22 such as in an outer side 23 or an inner side 24 or other location.

Figure 7:
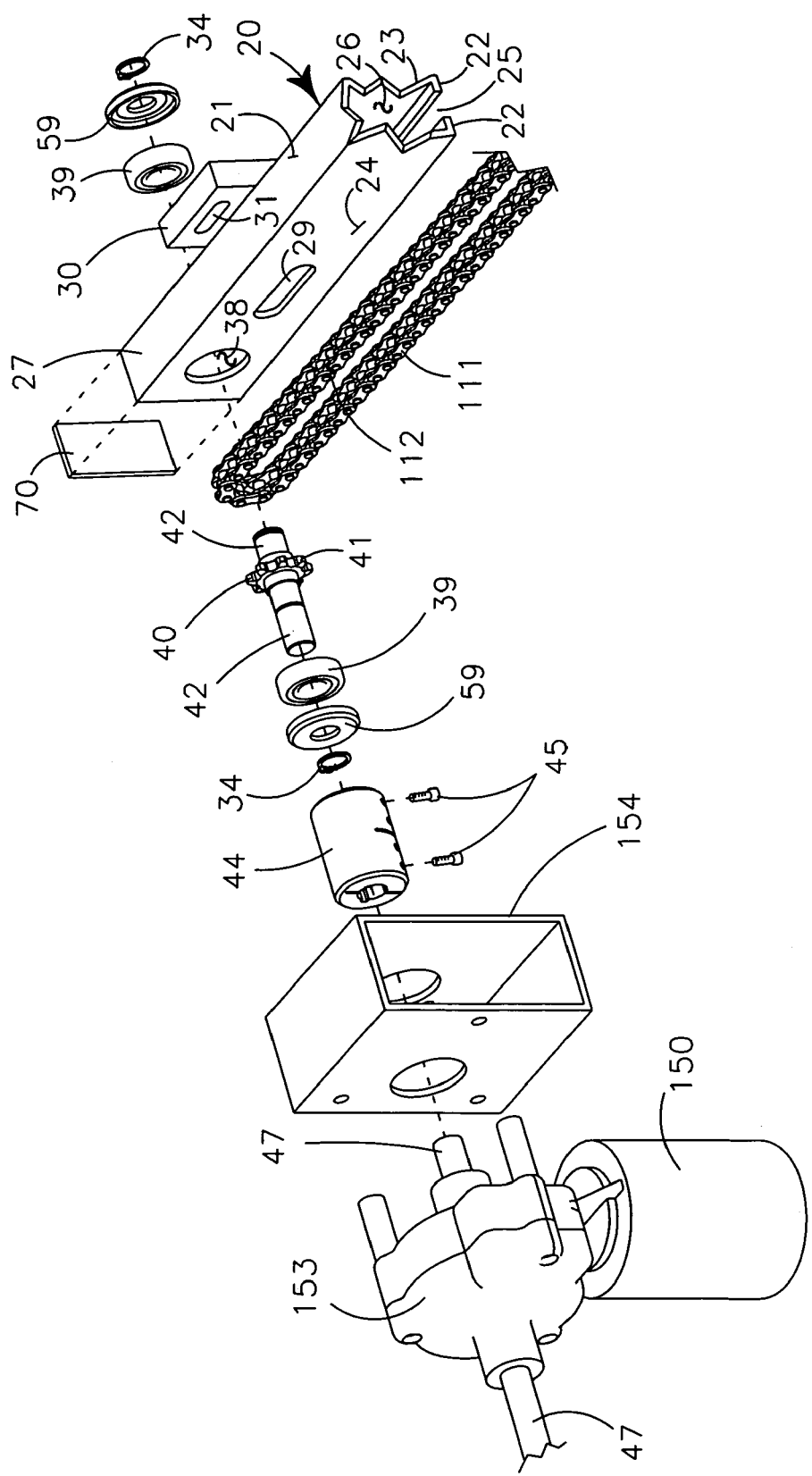
FIG. 7 is an enlarged exploded partial cut-away top, rear and side isometric view of the first front end portion of a slide rail and front sprocket assembly showing a second embodiment with an electric motor assembly interconnected with the front sprocket axle and drive shaft.

As shown in FIG. 7, front sprocket 40 is carried proximate first front end portion 27 of the slide rail 20. Front sprocket 40 is irrotatably carried by the front sprocket axle 42 which extends laterally outwardly from both sides of the front sprocket 40 to rotatably journal the front sprocket 40 on bearings 39, or bushings (not shown) or the like, carried in bearing holes 38 defined in the outer side 23 and inner side 24 of the slide rail 20 proximate the first front end portion 27. Outer circumferential surface of bearings 39, or bushings (not shown) or the like, frictionally communicate with inner circumferential edge of the bearing holes 38 providing positional maintenance of the bearings 39, or bushings (not shown) or the like, and front sprocket 40. Bearing caps 59, having a diameter larger than the diameter of the bearing holes 38, are carried on the front sprocket axle 42 adjacent outward each bearing 39, or bushing (not shown) or the like, and opposite the front sprocket 40, providing protection to the bearing 39, or bushings (not shown) or the like, from dirt and contaminants and the like and positionally retaining the front sprocket 40 and bearings 39, or bushings (not shown) or the like, within the medial channel 26 of the slide rail 20.

Driveshaft coupler 44 is releasably carried by front sprocket axle 42 extending laterally inwardly from the slide rail 20. Drive shaft set screws 45 threadably engage with the drive shaft coupler 44 creating an irrotatable interconnection between the front sprocket axle 42 and first end portion 48 of driveshaft 47. In a second embodiment, as shown in FIG. 7, an electric motor 150, gear assembly 153 and motor mount 154 may be installed proximate the first front end portion 27 of the side rail 20 to provide powered rotation to the front sprocket 40 and mechanically linked components.

Front mounting block 30 is carried on the outer side 23 of the slide rail 20 proximate the first front end portion 27 and is adjustably positionable on the slide rail 20 relative to the first front end portion 27. In a first embodiment, front mounting block 30 defines elongated fastener holes 31 extending therethrough for releasable fasteners (not shown), such as a bolt and the like, to adjustably releasably secure the front mounting block 30 to the first inner side 11 of the truck bed 10 proximate the truck bed front wall 14. In an alternative embodiment the mounting block 30 may be immovably attached to the slide rail 20.

An elongated hole 29 is defined in the inner side 24, and in the outer side 23, of slide rail 20 proximate the first front end portion 27. The elongated hole 29 is oriented so that major axis (not shown) is parallel to the length of the slide rail 20 and the elongated hole 29 is medially between the top 21, and bottom 22 so as to not interfere with roller chain 110 carried in the medial channel 26. Threaded fastener 33 extends through elongated hole 29 and threadably releasably engages with a threaded hole (not shown) defined in the front mounting block 30. Elongated hole 29 allows the position of the front mounting block 30 to be adjusted relative to the first front end portion 27 of the slide rail 20 as may be necessary to accommodate various truck bed 10 configurations. A spacing element (not shown) may need to be installed between the laterally outer side of the front mounting block 30 and the inner side 11, 12 of the truck bed 10 to ensure the slide rail 20 is parallel to the truck bed inner side 11, 12.

A removable cover (not shown) may be engaged with the elongated hole 29 to seal the elongated hole 29 to prevent entry of foreign objects into the medial channel 26 of the slide rail 20.

Rear sprocket housing 53 has a top 54, a bottom 55, an outer side 56 and an inner side 57 and is adjustably carried at the second rear end portion 28 of the slide rail 20. Rear sprocket housing 53 adjustably interconnects with the second rear end portion 28 of the slide rail 20 by various known means including, but not limited to, a male-female slide connection with threaded fasteners 72 engaging with threaded holes 73 to cause frictional positional maintenance, as well as interlocking tabs (not shown), brackets defining elongated holes with releasable fasteners extending therethrough (not shown), intermeshing slide rails (not shown) and the like to allow the rear sprocket housing 53 to be moved axially relative to the slide rail 20. Axial movement of the rear sprocket housing 53 relative to the second rear end portion 28 of the slide rail 20 provides a means to tension roller chain 110 within medial channel 26 of the slide rail 20. Other means for tensioning the roller chain 110 include, but are not limited to, an axially movable front sprocket housing (not shown), a spring biased chain tensioner (not shown) and routing the roller chain 110 through an "S" curve (not shown).

Rear sprocket 60 is carried by rear sprocket shaft 62 within the rear sprocket housing 53. A key (not shown) carried in a slot (not shown) or other known means makes the interconnection between the rear sprocket 60 and the rear sprocket shaft 62 irrotatable so that the rear sprocket 60 and the rear sprocket shaft 62 cannot rotate independently from the other. Rear sprocket shaft 62 extends laterally outwardly from both sides of the rear sprocket 60 so as to extend through bearing holes 58 defined in the outer side 56 and the inner side 57 of the rear sprocket housing 53. Bearings 63, bushings (not shown) or the like, are carried on the rear sprocket shaft 62 outwardly adjacent each side of the rear sprocket 60. Outer circumferential surface of bearings 63, bushings (not shown) or the like, frictionally communicate with inner circumferential edge of the bearing holes 58 providing positional maintenance of the bearings 63, bushings (not shown) or the like, to journal the rear sprocket shaft 62 and rear sprocket 60 within the rear sprocket housing 53. Bearing caps 59, having a diameter larger than the diameter of the bearing holes 58, are carried on the rear sprocket shaft 62 adjacent outward each roller bearing 63 opposite the rear sprocket 60 providing protection to the bearings 63 and positionally retaining the rear sprocket 60, rear sprocket shaft 62 and bearings 63 within the rear sprocket housing 53. Hand crank coupler 64 is carried at laterally inward end portion of the rear sprocket shaft 62.

Rear mounting block 50 is carried on the outer side 23 of the slide rail 20 proximate the second rear end portion 28 and defines elongated fastener holes 51 extending therethrough for releasable fasteners (not shown), such as bolts and the like to releasably attach the rear mounting block 50 to the first inner side 11 of the truck bed 10 proximate truck bed tailgate 13.

Because the configuration of the inner sides 11, 12 of truck beds 10 may vary from manufacturer to manufacturer, the rear mounting block 50 is preferably adjustably positionable on the slide rail 20 relative to the second rear end portion 28. In an alternative embodiment however, the mounting block 50 may be immovably attached to the slide rail 20.

In a first embodiment, an elongated hole 71 is defined in the inner side 24, and in the outer side 23 of the slide rail 20 proximate the second rear end portion 28. The elongated hole 71 is oriented so that major axis (not shown) is parallel to the length of the slide rail 20 and medially between the top 21, and bottom 22. A threaded fastener 74 extends through elongated hole 71 and threadably engages with a threaded hole (not shown) defined in the rear mounting block 50. The elongated hole 71, allows the position of the rear mounting block 50 to be adjusted relative to the second rear end portion 28 of the slide rail 20, and the rear sprocket housing 70. A spacing element (not shown) may need to be installed between the laterally outer side of the rear mounting block 50 and the inner side 11, 12 of the truck bed 10 to ensure the slide rail 20 is parallel to the truck bed inner side 11, 12.

A removable cover (not shown) may be engaged with the elongated hole 71 to seal the elongated hole 71 to prevent entry of foreign objects into the medial channel 26 of the slide rail 20.

In alternative contemplated embodiments the front mounting block 30 and rear mounting block 50 are adjustably positionable on the slide rail 20 to accommodate differing configurations of truck beds 10 by means such as, but not limited to, cooperatively interconnecting rails and grooves (not shown), and by use of a slot (not shown) defined in the slide rail and slidably releasably carrying a mounting pad (not shown) therein.

If the inner sides 11, 12 of the truck bed 10 carries previously installed fastening points (not shown) such as threaded nuts secured to the inner sides 11, 12 of the truck bed 10, the releasable fasteners (not shown) may be interconnected with the previously installed fastening points (not shown) by adjusting the position of the front mounting block 30 and the rear mounting block 50 on the slide rail 20.

In a first embodiment, roller chain 110 is used as a means to communicate rotational motion of one sprocket 40, 60 to the spaced apart sprocket 40, 60. Roller chain 110 is comprised of a plurality of known interconnected roller chain links and at least one removable roller chain link (not shown) so that end portions of the roller chain 110 can be joined together forming an endless loop. Roller chain 110 communicates between the front sprocket 40 and the rear sprocket 60 through the medial channel 26 defined by slide rail 20 so that rotational motion of the rear sprocket 60 is communicated to the front sprocket 40, and rotational motion of the front sprocket 40 is communicated to the rear sprocket 60.

In alternative contemplated embodiments, the means to communicate the rotational motion from one sprocket 40, 60 to the opposing sprocket 40, 60 may also be, but is not limited to, a belt (not shown) such as a tog belt (not shown), a cable (not shown), a strap (not shown) and the like such that rotational motion of one sprocket 40, 60 is communicated to the opposing sprocket 40, 60. It is further contemplated that means other than sprockets 40, 60 may be used to carry, engage with and facilitate the means to transfer motion therebetween such as, but not limited to, wheels (not shown), pulleys (not shown), cogs (not shown) and the like. It is further contemplated that the means need not form an endless loop as opposing end portions of the means may be fastened proximate one another, for instance to sliding gate block 90, to chain plate 105 or the like.

Figure 6:
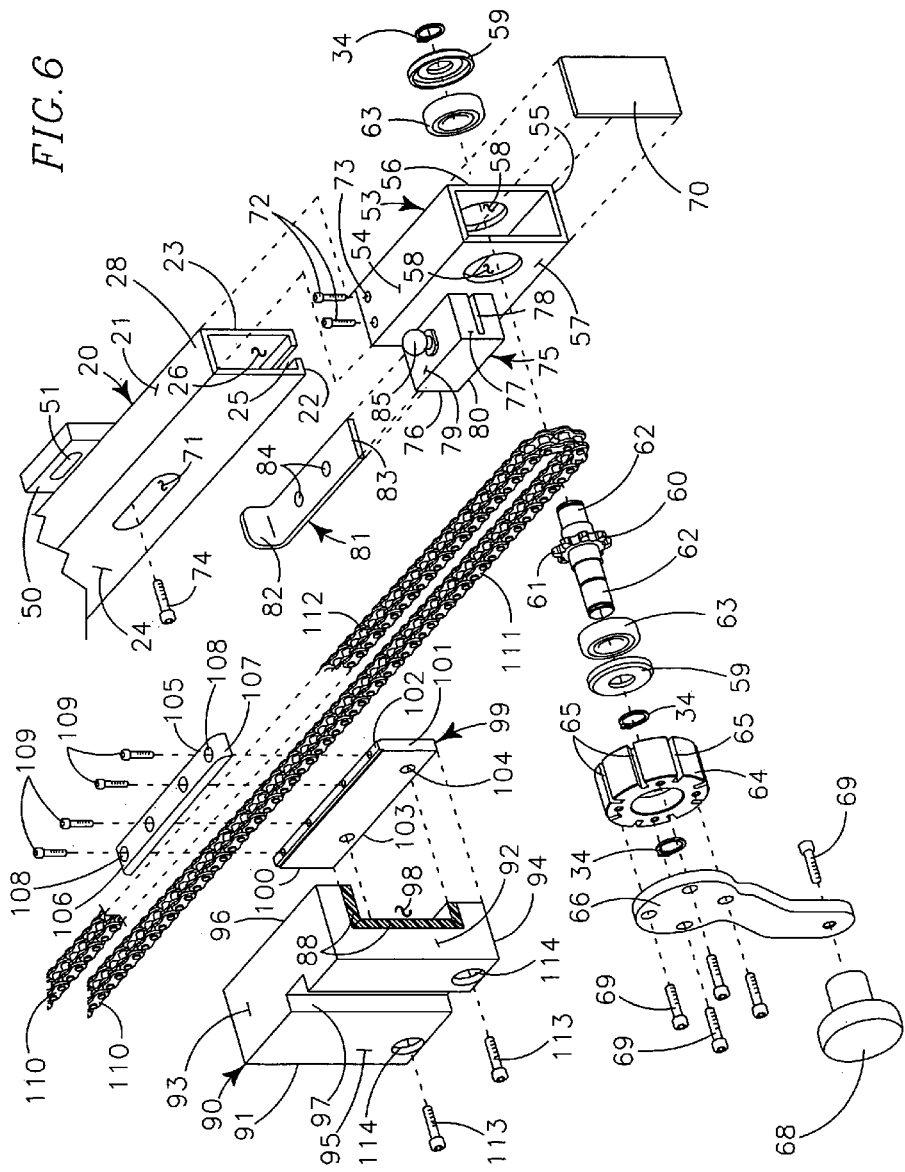
FIG. 6 is an enlarged exploded partial cut-away top, rear and side isometric view of the second rear end portion of a slide rail, rear sprocket housing, hand crank assembly, locking assembly, sliding gate block and roller chain showing the orientation of the various components.

As shown in FIG. 6, hand crank 66 has a first end portion defining a plurality of spacedly arrayed holes for releasable fasteners 69 to releasably attach the hand crank 66 to the hand crank coupler 64. Handle 68 is carried at end portion of hand crank 66 opposite the hand crank coupler 64 to facilitate grasping, gripping and rotation by a user for manual operation of the apparatus.

Handle lock block 75 is carried on the inner side 57 of the rear sprocket housing 53 and has a top 79, a bottom 80, a front end portion 76 and a rear end portion 77. Handle lock block 75 defines lock slide slot 78, adjacent the rear sprocket housing 53, medially between the top 79 and bottom 80, that extends from the front end portion 76 to the rear end portion 77. Lock slide 81 is slidably carried within the lock slide slot 78. In a first embodiment, the lock slide 81 has an upwardly curved front end portion 82 to facilitate manual manipulation by a user, a spaced apart opposing rear end portion 83, and defines two spaced apart locking pin holes 84. Rear end portion 83 of the lock slide 81 may extend outwardly from the lock slide slot 78 at the rear end portion 77 of the handle lock block 75 to frictionally engage with the hand crank coupler 64.

A locking pin hole (not shown) is defined in the handle lock block 75 extending from the top 79 to the bottom 80 and carries removable locking pin 85 that extends therethrough. Rearmost locking pin hole 84 defined in the lock slide 81 is positioned proximate the rear end portion 83 so that when the removable locking pin 85 is aligned therewith and extends therethrough, the locking slide 81 must be moved forwardly within the lock slide slot 78 so that rear end portion 83 of the lock slide 81 does not extend rearwardly from the lock slide block 75. Forwardmost locking pin hole 84 defined in the lock slide 81 is proximate the upwardly curved front end portion 82 so that when the removable locking pin 85 extends therethrough, the rear end portion 83 of the lock slide 81 extends rearwardly outwardly from the lock slide block 75 and frictionally engages with the hand crank coupler 64.

As shown in FIG. 6, hand crank coupler 64 defines plural spacedly arrayed radial slots 65. Rear end portion 83 of the lock slide 81 extending rearwardly from the lock slide block 75 releasably engages with the radial slots 65 to prevent rotation of the hand crank coupler 64 and movement of the interconnected components. Engagement of the rear end portion 83 of the lock slide 81 with radial slots 65 is maintained by removable locking pin 85 passing through the forward locking pin hole 84 defined in the locking slide 81. In the preferred embodiment the removable locking pin 85 has a lanyard (not shown) communicating between the removable locking pin 85 and the lock slide block 75 to prevent loss of the removable locking pin 85. The removable locking pin 85 may also have a spring biased radially extending ball bearing (not shown) at end portion that is first inserted into the locking pin hole (not shown) defined in the lock slide block 75 to positionally maintain the locking pin 85 and prevent inadvertent withdrawal of, or loss of, the removable locking pin 85 such as when the vehicle is operated on a bumpy road. In an alternative embodiment, a known friction brake (not shown) may be used to engage with the hand crank coupler 64 or any one of the rotating or moving elements of the apparatus to provide a locking mechanism to prevent unwanted rotation of the sprockets 40, 60 and unwanted movement of the interconnected components.

Figure 5:
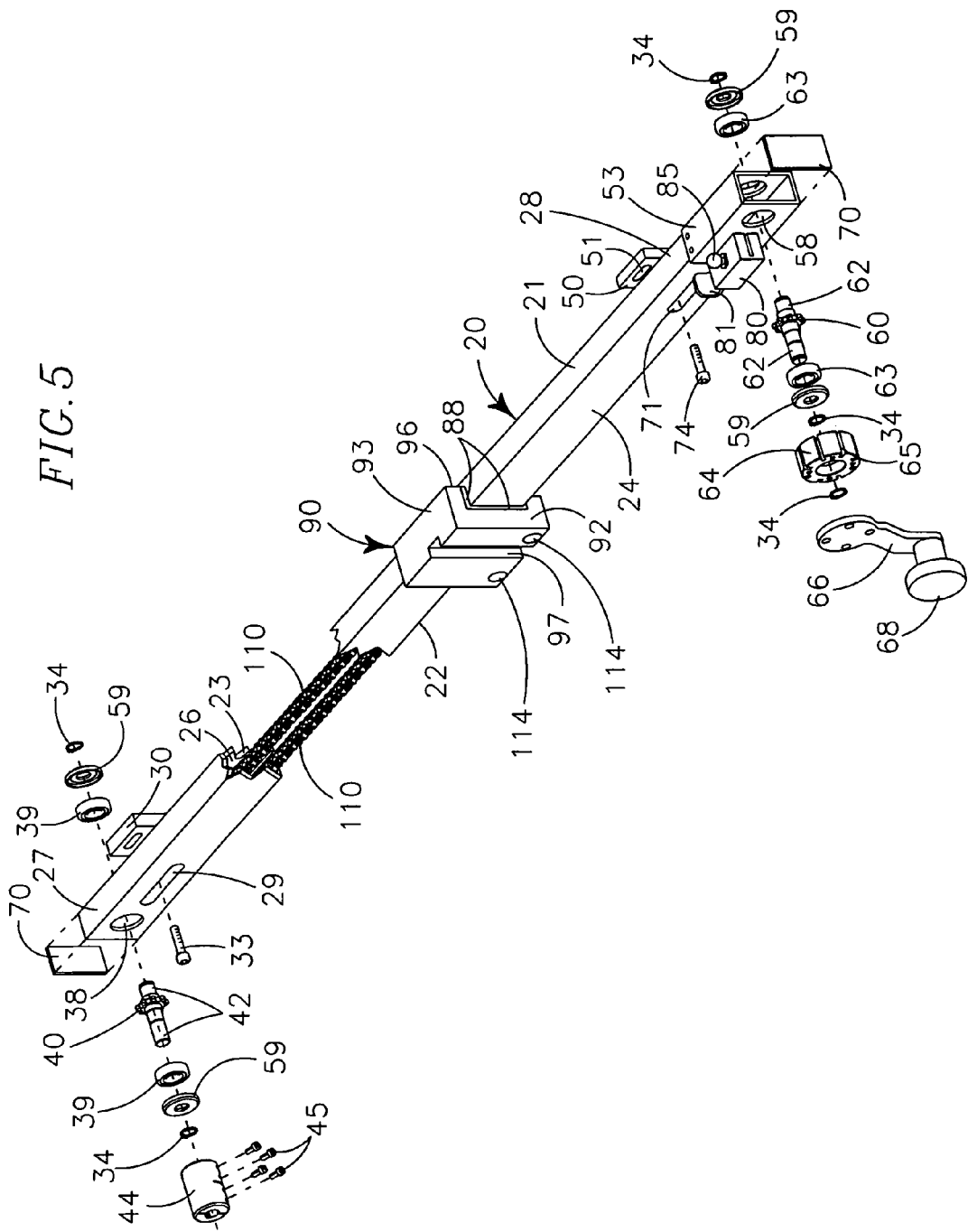
FIG. 5 is an exploded partial cut-away isometric top, rear and side view of one slide rail showing the orientation and position of the various components.

As shown in FIGS. 5 and 6, sliding gate block 90 has a forward end portion 91, a rearward end portion 92, a top 93 and a bottom 94. Gate slot 97 is a vertically oriented slot defined in inner side portion 95 of the sliding gate block 90 extending from the top 93 to the bottom 94. Rail channel 98 is a horizontally oriented channel defined in outer side portion 96 extending from the forward portion 91 to the rearward end portion 92 for engagement with the top 21, inner side 24 and bottom 22 of the slide rail 20. The rail channel 98 preferably defines a configuration similar to a portion of peripheral shape of the slide rail 20. In the preferred embodiment the rail channel 98 of the sliding gate block 90 is lined with inserts 88 (FIG. 6) of ultrahigh molecular weight plastic, also known as UHMW, which has desirable characteristics of being very hard, very durable and also very "slippery". These characteristics eliminate the need for bearings and the like to facilitate smooth slideable movement of the sliding gate block 90 along the length of the slide rail 20 although it is anticipated that bearings and the like (not shown) may also be used to facilitate smooth movement of the sliding gate block 90. The sliding movement also provides a "wiping" action as the sliding gate block 90 moves along the slide rail 20 effectually wiping away ice, snow, dust and other contaminants. The inserts 88 are releasably attached to the interior surfaces of the rail channel 98 with releasable fasteners (not shown) to facilitate replacement and cleaning of the inserts 88 as necessary. In an alternative embodiment, it is contemplated materials other than UHMW, such as but not limited to polyethylene, polypropylene, and the like may be used for inserts 88.

Rail slot guide 99 is releasably attachable to the outer side 96 of the sliding gate block 90 proximate the bottom 94 with fasteners 113 extending through holes 114 defined in the sliding gate block 90. As shown in FIG. 9, the rail slot guide 99 forms a "vertical fin" and that extends upwardly into slot 25 defined in the bottom 22 of the slide rail 20. Chain plate 105 is releasably attached to the rail slot guide 99 with plural threaded fasteners 109 that extend vertically through the chain plate 105 and lower course 111 of the roller chain 110 effectively "sandwiching" the lower course 111 of roller chain 110 between bottom of the chain plate 105 and upper edge of the rail slot guide 99 providing a secure interconnection therebetween. If the slot 25 is defined in the slide rail 20 at a position other than the bottom 22, the rail slot guide 99 is configured to communicate through the slot 25 and still interconnect with the sliding gate block 90.

Translational movement of the roller chain 110 within the medial channel 26 causes the sliding gate block 90 to move along the length of the slide rail 20. Positioning the interconnection of the sliding gate block 90 and the roller chain 110 within the medial channel 26 protects the interconnection and minimizes risk of damage to the interconnection, by the build up of ice and dirt and the like and minimizes the risk of injury to a user who might get a finger or clothing entangled with the roller chain 110 during operation. In the first embodiment the roller chain 110 is enclosed within the slide rail 20 medial channel 26 but it is contemplated that in alternative embodiments (not shown) that one or both of an upper course 112 and a lower course 111 of the roller chain 110, or alternative moving means, may be carried other than inside the slide rail 20.

As shown in FIGS. 2 and 5, drive shaft coupler 44 interconnects driveshaft 47 with the front sprocket axle 42 so that the driveshaft 47 communicates rotational motion of the front sprocket axle 42 to the second slide rail assembly 20a carried at the opposing second inner side 12 of the truck bed 10. Drive shaft set screws 45 make the interconnection of the drive shaft coupler 44 with the front sprocket axle 42 and the drive shaft 47 irrotatable and yet preserves adjustability. A cover (not shown) may be attached to the forward wall 14 of the truck bed 10 to enclose the drive shaft 47 and to protect the drive shaft 47 from damage and to increase aesthetic appeal.

End caps 70 are carried at rearward most end portion of the rear sprocket housing 53 and at the forward most end portion of the slide rail 20 to make the ends aesthetically appealing and also to prevent entry of foreign objects into the working mechanism of the apparatus.

Gate 120 may have a variety of configurations, but in the preferred embodiment has a first end portion 125, an opposing second end portion 126, a top rail 121, a bottom rail 122 and a medial rail 123 therebetween. A plurality of vertical elements 124 communicate between the top rail 121 and medial rail 123 and between medial rail 123 and bottom rail 122, or between the top rail 121 and the bottom rail 122 providing a grate-like barrier that allows passage of air therethrough, but prevents passage of larger items such as packages. Vertical elements 124 may be rigid such as metal or plastic bars, or flexible such as rope (not shown), straps (not shown), netting (not shown) and the like. End to end length of the bottom rail 122 may be less than the length of the top rail 121 so that the gate 120 may pass forwardly and rearwardly of truck bed 10 laterally inwardly extending wheel wells 15, if the truck bed 10 has wheel wells 15.

In another embodiment the gate 120 is configured to carry supports such as, but not limited to, bicycle supports, golf bag supports, cradles for kayaks, containers for tools and the like.

As shown in FIG. 9, gate block vanes 127 are generally rectilinear planar elements releasably adjustably attached with fasteners 132 to the first and second end portions 125, 126 respectively of the gate 120 spaced adjacent the top rail 121. The gate block vane 127 releasably slidably engages in the vertical gate slot 97 defined in each sliding gate block 90. Vane bumper 128 is carried at upper end portion of the gate block vane 127 and extends generally perpendicularly forwardly and rearwardly therefrom and is releasably fastened thereto with fasteners 129. Vane bumper 128 limits the vertical movement of the gate 120 relative to the sliding gate block 90 so that the bottom rail 122 of the gate 120 does not frictionally contact truck bed floor 17, but instead is positionally maintained slightly above the truck bed floor 17. Plural vertically spaced height adjustment holes 131 are defined in the first end portion 125 and second end portion 126 of the gate 120 so that the height of the gate 120 above the truck bed floor 17 may be adjusted by changing the position of the gate block vane 127 to accommodate items such as truck bed liners (not shown) and truck bed mats (not shown) that may alter the depth of the truck bed 10 relative to the slide rails 20, 20a. Spacers (not shown) may be installed between the first and second end portions 125, 126 respectively of the gate 120 and the gate block vanes 127 to adjust the overall length of the gate 120 to accommodate varying widths of truck bed 10.

As shown in FIG. 4 and FIG. 8, T-gate 135 is a rectilinear structure having a top rail 136, a bottom rail 137, a front rail 138 and a rear rail 139. The front rail 138 and rear rail 139 are interconnected at opposing end portions with opposing end portions of the top rail 136 and the bottom rail 137 respectively. Plural vertical spindles 140 communicate between the top rail 136 and the bottom rail 137 forming a grate-like structure. Vertical spindles 140 may be rigid such as metal or plastic bars, or flexible such as rope (not shown), straps (not shown), netting (not shown) and the like and may extend between the front and rear rails 138, 139 and the top and bottom rails 136, 137 forming a grate-like barrier.

Mounting clamp 141 carried at interconnection of the top rail 136 and the front rail 138 has a forward clamp portion 143 defining a concave notch 148 and a rearward clamp portion 144 defining a similar opposing concave notch 149. The forward 143 and rearward 144 portions are releasably interconnected by a tightening handle 145 carrying a bolt-type threaded fastener 146 that extends through a hole (not shown) defined in the forward portion 143 and threadably engaging in a threaded hole (not shown), defined in the rearward portion 144. By twisting tightening handle 145, the forward and rearward mounting clamp portions 143, 144 frictionally squeeze the top rail 121 of the gate 120 therebetween to secure the T-gate 135 in position. The adjustability of the mounting clamp 141 allows the T-gate 135 to be moved along the length of the gate 120 from a position adjacent the first inner side 11 of the truck bed 10 to a position adjacent to the second inner side 12 of the truck bed 10. Transverse movement of the T-gate 135 relative to the gate 120 allows loads to be restrained from side-to-side movement within the truck bed 10 while the gate 120 prevents forward and rearward movement of the load within the truck bed 10. The mounting clamp 141 also permits the T-gate 135 to be moved to a position extending forwardly from the gate 120 if desired (not shown).

As shown in FIG. 7, in a second embodiment, an electric motor 150, a gear box 153 and a motor mount 154 may be interconnected with the driveshaft coupler 44 communicating with the front sprocket axle 42 and interconnected with drive shaft 47. Known electrical connections (not shown) including an operator switch (not shown) interconnect the motor 150 with the vehicle electrical system (not shown) providing electrical power to the motor 150 for rotating the drive shaft 47, front sprockets 40, 40a and the means to move the sliding gate blocks 90, 90a and gate 120 forwardly and rearwardly within the truck bed 10. It is also envisioned the motor 150, gear box 153 and related components may be carried proximate the tailgate end portion 17 of the truck bed 10.

Having described the structure of my load securing and moving apparatus for truck bed its operation may be understood.

For installation and use of my load securing and moving apparatus for a truck bed 10 it is first necessary to interconnect the rail slot guide 99 and chain plate 105 with roller chain 110 which occurs by orienting the rail slot guide 99 immediately adjacent below and parallel to a lower course 111 of roller chain 110 and orienting the chain plate 105 immediately adjacent above and parallel to the lower course of roller chain 110. Fasteners 109 are inserted through fastener holes 108 defined by the chain plate 105 through spaces (not shown) in the roller chain 110 and engaging the fasteners 109 in threaded holes (not shown) defined in the rail slot guide 99.

End portions (not shown) of the roller chain 110 are interconnected to one another with a known removable roller chain link (not shown) so the roller chain 110 forms an endless loop. The looped roller chain 110 is flattened so an upper course 112 of the roller chain 110 is formed immediately adjacent above the lower course 111 of the roller chain 110 and the flattened loop of roller chain 110 is threaded into and through the medial channel 26 defined by the slide rail 20 with the rail slot guide 99 extending through the slot 25 defined in the slide rail 20.

Roller chain 110 is oriented so that a portion of the loop extends outwardly from the medial channel 26 at the first front end portion 27 of slide rail 20.

Front sprocket 40 is inserted through the bearing holes 38 defined in the inner side 24 and outer side 23 of the slide rail 20 proximate the first front end portion 27 and is positioned so that upper course 112 of roller chain 110 is above the front sprocket 40 and lower course 111 of roller chain 110 is below the front sprocket 40 so that sprocket teeth 41 defined by the front sprocket 40 engage with the roller chain 110. Bearings 39 are interconnected with the front sprocket axle 42 on both sides of the front sprocket 40 to rotatably journal the front sprocket 40 within the medial channel 26 of the slide rail 20. Bearing caps 59 are placed on the front sprocket axle 42 outward of each bearing 39 to protect the moving components of the roller bearings 39 and to "sandwich" the front sprocket 40 and bearings 39 within the medial channel 26 of the slide rail 20. Split-ring type fasteners 34 releasably carried in circumferentially extending annular grooves (not shown), or other known fastening means such as maintenance rings, (not shown) are used to positionally secure the bearing caps 59 and bearings 39 on the front sprocket axle 42 and to secure the front sprocket assembly within the slide rail 20. End cap 70 is interconnected with the first front end 27 of the slide rail 20 to prevent entry of foreign objects into the medial channel 26.

The roller chain 110 is tensioned toward the second rear end portion 28 of the slide rail 20 so that the looped roller chain 110 extends outwardly from the medial channel 26 at the second end portion 28 of the slide rail 20.

Rear sprocket housing 53 is oriented relative to the second rear end portion 28 of the slide rail 20 so that the looped roller chain 110 extends therethrough from the forward end portion to the rearward end portion.

Rear sprocket 60 irrotatably carried on rear sprocket shaft 62 is inserted into rear sprocket housing 53 through the sprocket shaft holes 58. Similar to installation of the front sprocket 40, the rear sprocket 60 is positioned adjacent above the lower course 111 of roller chain 110, and adjacent below the upper course 112 of roller chain 110 so that rear sprocket teeth 61 engage with the roller chain 110.

Bearings 63 are fitted onto the rear sprocket shaft 62 on both sides of the rear sprocket 60 to rotatably journal the rear sprocket 60 in the rear sprocket housing 53. Bearing caps 59 are interconnected to the rear sprocket shaft 62 outward of the bearings 63 to protect the bearings 63 and to "sandwich" the rear sprocket 60 and bearings 63 within the rear sprocket housing 53. Split-ring fasteners 34 releasably carried in circumferentially extending annular grooves (not shown), or other known fastening means such as maintenance rings (not shown), are used to positionally secure the bearing caps 59 and bearings 63 on the rear sprocket shaft 62 and to secure the rear sprocket assembly within the rear sprocket housing 53. End cap 70 is interconnected with the rearward end portion of the rear sprocket housing 53 to prevent foreign objects and the like from entering the rear sprocket housing 53. Hand crank coupler 64 is interconnected to laterally inwardly extending end portion of the rear sprocket shaft 62 and is releasably secured thereto with a split ring fastener 34 that releasably engages with a circumferentially extending annular groove (not shown) defined therein.

Rear sprocket housing is moved axially rearwardly relative to the slide rail 20 so that the roller chain 110 is tensioned between the front sprocket 40 and the rear sprocket 60 within the medial channel 26. The rear sprocket housing 53 is adjustably positionally secured in the tensioned position by known means, such as with threaded fasteners 72 engaging in threaded holes 73 defined in the bottom 55 of the rear sprocket housing 53 and frictionally engaging with the bottom 22 of the slide rail 20.

The locations to attach the front mounting block 30 and the rear mounting block 50 are determined by examining the inner sides 11, 12 of the truck bed 10, taking appropriate measurements, ensuring the attachment locations for the front mounting block 30 and rear mounting block 50 are the same vertical height above the truck bed floor 17 and ensuring that any holes and fasteners will not damage the exterior surfaces (not shown) of the vehicle. If spacer elements (not shown) are necessary to space the slide rail 20 inwardly from the inner side 11 of the truck bed 10 the spacer elements (not shown) should be attached to the truck bed 10 inner side 11 as desired.

The front mounting block 30 is loosely fastened to the slide rail 20 proximate the first front end portion 27 by inserting threaded fastener 33 through elongated hole 29 and threadably engaging the fastener 33 in the threaded hole (not shown) defined in the front mounting block 30. Fastener 33 is not tightened until the front mounting block 30 has been securely attached to the truck bed 10 inner wall 11 proximate the front wall 14 at the previously located attachment point, or to the previously installed spacer element (not shown).

Similar to attachment of the front mounting block 30, the rear mounting block 50 is loosely fastened to the slide rail 20 proximate the second rear end portion 28 by inserting threaded fastener 74 through elongated hole 71 and threadably engaging the threaded fastener 74 in the threaded hole (not shown) defined in the rear mounting block 70. Fastener 74 is not tightened until the rear mounting block 50 has been securely attached to the truck bed 10 inner side 11 proximate the tailgate end portion 13 at the previously located attachment point, or to the previously installed spacer element (not shown).

For purposes of this description it is assumed spacer elements (not shown) are not necessary for installation of the slide rail 20.

Slide rail 20 is positioned adjacent the first inner side 11 of pickup truck box 10 with first front end portion 27 proximate truck box front wall 14, and the second rear end portion 28 proximate tailgate end portion 13. The slide rail 20 is positioned at a desired height within the pickup truck bed 10 preferably proximate upper edge of the pickup truck bed 10 and parallel thereto. A known marking tool, such as a pencil or felt tip pen is used to mark locations for mounting holes to be drilled in the first inner side 11 of the pickup truck bed 10 by inserting the known marking tool into the mounting block fastener holes 31 defined in the front mounting block 30 and the mounting block fastener holes 51 defined in the rear mounting block 50 after the mounting blocks 30, 50 have been aligned with the previously located attachment points. The locations to form the mounting holes (not shown) may also be determined with a pattern (not shown), a jig (not shown), by precise measuring and the like. After the locations have been marked, a known tool, such as a drill is used to form the holes in the first inner side 11 of the truck bed 10 at the previously marked locations.

It is contemplated that some pickup manufacturers may permanently install fastening means (not shown) such as threaded nuts (not shown) in the truck bed 10 inner sides 11, 12 during the manufacturing of the truck bed 10. If such fastening means (not shown) are available, such means may be utilized rather than marking and drilling holes in the truck bed 10.

After holes (not shown) have been formed, the slide rail 20 is positioned so that the mounting block fastener holes 31, 51 are aligned with the holes (not shown). Fasteners (not shown) such as bolts, screws, rivets and the like are inserted through the mounting block fastener holes 51, 31 to engage with the holes (not shown) to secure the slide rail 20 to the first inner side 11 of the pickup truck box 10.

The process is repeated for mounting the second slide rail 20a to the second inner side 12 of the pickup truck bed 10.

After both slide rails 20, 20a have been installed in the truck bed 10 it is necessary to tighten fasteners 33, 33a 74, 74a to securely attach the slide rails 20, 20a to the front and rear mounting blocks 30, 30a, 50, 50a and to install covers (not shown) over the elongated holes 29, 29a, 71, 71a to prevent entry of foreign objects into the medial channel 26, 26a. It is also necessary to align the rail slot guides 99, 99a of each slide rail 20, 20a with each other.

Alignment of the rail slot guides 99, 99a is most easily accomplished by manually moving each rail slot guide 99, 99a to the same extreme end portion 27, 27a or 28, 28a of the slide rails 20, 20a. After the rail slot guides 99, 99a are moved to the same extreme end portion 27, 27a or 28, 28a, the driveshaft 47 is positioned adjacent the truck bed front wall 14 between the slide rails 20, 20a. Driveshaft coupler 44 is interconnected with first end portion 48 of the driveshaft 47 and secured with set screws 45. Second driveshaft coupler 44a is installed on second end portion 49 of the driveshaft 47 but is not fixedly attached thereto, so that the second drive shaft coupler 44a may slide axially along the length of the driveshaft 47.

First driveshaft coupler 44 is interconnected to inwardly extending front sprocket axle 42 of front sprocket 40 of slide rail 20 by tightening fasteners 45. Thereafter, second driveshaft coupler 44a is moved axially along the length of the driveshaft 47 to the second end portion 49 opposite the first drive shaft coupler 44. Second end portion 49 of the drive shaft 47 is axially aligned with the inwardly extending front sprocket axle 42a. Second driveshaft coupler 44a is irrotatably secured to the driveshaft 47 and the front sprocket axle 42a by tightening set screws 45. If necessary, the length of the driveshaft 47 may be adjusted by cutting. If a drive shaft cover (not shown) is to be installed, such cover (not shown) may be affixed to the truck bed front wall 14 to cover and protect the drive shaft 47.

Sliding gate block 90 is positioned on the slide rail 20 adjacent inward the rail slot guide 99 that extends downwardly through the slot 25 defined in the bottom 22 of the slide rail 20. The sliding gate block 90 is positioned so that the slide rail 20 is partially carried within the rail channel 98 so that the ultra high molecular weight plastic (UHMW) inserts 88 frictionally communicate with the laterally inner side 24, top 21 and bottom 22 of the slide rail 20. Fasteners 113 are inserted through fastener holes 114 defined in the sliding gate block 90 and interconnected with threaded holes 104 defined in rail slot guide 99. The process is repeated to install sliding gate block 90a on slide rail 20a.

Hand crank 66 is interconnected with the hand crank coupler 64 with fasteners 69 so that rear sprocket 60 may be manually rotated causing interconnected roller chain 110 to move which responsively causes the front sprocket 40 to rotate. Rotation of the front sprocket 40 is transferred, by means of the driveshaft 47 to front sprocket 40a, roller chain 110a and rear sprocket 60a of the second slide rail 20a causing the mechanically interconnected components to move and rotate accordingly.

If any alignment adjustments of the sliding gate blocks 90, 90a, are needed such adjustments may be made by loosening set screws 45 carried by driveshaft couplers 44, 44a and rotating one of the front sprockets 40, 40a. Once the alignment of the sliding gate blocks 90, 90a is accomplished the driveshaft couplers 44, 44a may be re-secured by tightening set screws 45.

The gate 120 is installed and removed by sliding the gate block vanes 127, 127a vertically into and vertically out of vertical gate slots 97, 97a defined in sliding gate blocks 90, 90a. If bottom rail 122 of the gate 120 physically contacts the truck bed floor 17, it may be necessary to adjust the vertical position of the gate block vanes 127, 127a. Vane height adjustment holes 131 defined in first and second end portions 125, 126 respectively of the gate 120 permit the vertical position of the gate block vanes 127, 127a, to be adjusted as desired by removing and then re-attaching fasteners 132.

The T-Gate 135 is installed on the top rail 121 of the gate 120 by loosening tightening handle 145 so that the forward clamp portion 143 and the rearward clamp portion 144 may be separated from one another sufficiently so that the top rail 121 of the gate 120 may be positioned within the concave notches 148, 149 defined by the forward clamp portion 143 and the rearward clamp portion 144. Tightening and loosening the tightening handle 145 allows the T-gate 135 to be adjustably positioned as desired.

Having thusly described my invention, what I desire to protect by Letters Patent, and

What I claim is:

1. A load securing and moving apparatus for a truck bed having first and second inner side walls, a front wall and a truck bed floor, the load securing and moving apparatus comprising in combination:

a first slide rail carried on the truck bed first inner side wall proximate an upper edge of the truck bed first inner side wall and a second slide rail carried on the truck bed second inner side wall proximate an upper edge of the truck bed second inner side wall, the first slide rail and the second slide rail each having a generally rectilinear cross-section having a top portion, a bottom portion, first front end portion and an opposing second rear end portion and, each slide rail defining a medial channel communicating between the first front end portion and the second rear end portion and a slot defined in the bottom portion communicating between the first front end portion and the second rear end portion;

a respective sliding gate block carried on each slide rail to move along a length of each slide rail, each sliding gate block
defining a rail channel in a laterally outer side portion, the rail channel having a configuration that slidably engages with the top portion, the bottom portion and a laterally inner side portion of each slide rail, and
a vertical fin at a bottom laterally outer portion that passes into and through the respective slot defined in the bottom portion of each slide rail;
an endless loop moving means for moving each sliding gate block along the length of the first slide rail and the length of the second slide rail, the endless loop moving means carried within the medial channel defined by each slide rail and releasably interconnected to the vertical fin of each sliding gate block extending into and through the slot defined in the bottom portion of each slide rail;
a rotation means carried proximate the first front end portion of each slide rail communicating with the endless loop moving means and a rotation means carried proximate the second rear end portion of each slide rail communicating with the endless loop moving means;
one drive shaft communicating between the first front end portion of the first slide rail and the first front end portion of the second slide rail to communicate movement of the endless loop moving means within the medial channel of the first slide rail to the endless loop moving means within the medial channel of the second slide rail; and
a removable gate extending between the sliding gate block carried on the first slide rail and the sliding gate block carried on the second slide rail.

2. The load securing and moving apparatus for a truck bed of claim 1 wherein the endless loop moving means is a roller chain.

3. The load securing and moving apparatus for a truck bed of claim 1 further comprising a tensioning means communicating with the endless loop moving means carried within the medial channel defined by each slide rail to remove slack from the endless loop moving means.

4. The load securing and moving apparatus for a truck bed of claim 1 further comprising a crank handle carried at the second rear end portion of one of said slide rails, the crank handle communicating with the rotation means and the endless loop moving means to move the sliding gate blocks along the lengths of the first and second slide rail.

5. The load securing and moving apparatus for a truck bed of claim 1 further comprising a motor interconnected with the endless loop moving means for moving the sliding gate blocks along the length of the first slide rail and the length of the second slide rail.

6. The load securing and moving apparatus for a truck bed of claim 1 further comprising:
a front mounting block proximate the first front end portion of each slide rail to releasably attach the first front end portion of each slide rail to the respective inner side wall of the truck bed;
a rear mounting block proximate the second rear end portion of each slide rail to releasably attach the second rear end portion of each slide rail to the respective inner side wall of the truck bed;
a fastener hole defined in each front mounting block and in each rear mounting block for a releasable fastener to pass there through to releasably fasten each front mounting block and each rear mounting block to the inner side walls of the truck bed; and
each front mounting block and each rear mounting block is adjustably positionable on the first and second slide rails.

7. The load securing and moving apparatus for a truck bed of claim 1 further comprising a motion limiting means to prevent unintentional movement of the endless loop moving means within the medial channel defined by each slide rail.

8. The load securing and moving apparatus for a truck bed of claim 1 further comprising:
replaceable inserts within the rail channel defined in each sliding gate block to facilitate slidable movement of each sliding gate block along the length of the first slide rail and the length of the second slide rail.

9. The load securing and moving apparatus for a truck bed of claim 8 wherein the replaceable inserts are ultra high molecular weight plastic.

10. The load securing and moving apparatus for a truck bed of claim 1 further comprising a T-gate adjustably attachable to the removable gate which extends between the first and second slide rails, said T-gate extending angularly to the removable gate extending between the first and second slide rails.

11. A load securing and moving apparatus for a truck bed having first and second inner side walls, a front wall and a truck bed floor, the load securing and moving apparatus comprising in combination:
a first slide rail carried on the first inner side wall and a second slide rail carried on the second inner side wall, the first and second slide rail each having
a first front end portion and an opposing second rear end portion,
a top portion and an opposing bottom portion,
an outer side portion and an opposing inner side portion,
a medial channel communicating between the first front end portion and the second rear end portion, and
a slot defined in the bottom portion communicating between the first front end portion and the second rear end portion;
a front sprocket rotatably carried on an axle proximate the first front end portion of the first slide rail and the first front end portion of the second slide rail within the medial channel defined by the first slide rail and the second slide rail;
a rear sprocket rotatably carried in a rear sprocket housing at the second rear end portion of each slide rail, the rear sprocket housing axially adjustably positionable relative to the second rear end portion of the slide rail;
a roller chain within the medial channel of each slide rail communicating between the front sprocket and the rear sprocket;
one drive shaft communicating between the first front end portion of the first slide rail and the first front end portion of the second slide rail for transferring rotational motion of the front sprocket of the first slide rail to the front sprocket of the second slide rail;
a sliding gate block carried on each slide rail, each sliding gate block having a vertical fin communicating with the roller chain inside the medial channel of each slide rail through the slot defined in the bottom portion of each slide rail;
a hand crank communicating with one of the rear sprockets within its respective rear sprocket housing to rotate the one rear sprocket; and
a removable gate extending between the sliding gate block carried on the first slide rail and the sliding gate block carried on the second slide rail.

12. The load securing and moving apparatus for a truck bed of claim 1 wherein the endless loop moving means is an endless belt.

13. The load securing and moving apparatus for a truck bed of claim 1 wherein the rotation means are sprockets.

14. The load securing and moving apparatus for a truck bed of claim 1 wherein the rotation means are wheels.

* * * * *